US009690331B2

(12) United States Patent
He et al.

(10) Patent No.: US 9,690,331 B2
(45) Date of Patent: Jun. 27, 2017

(54) ELECTRONIC APPARATUS AND METHOD FOR PRODUCING HOUSING THEREOF

(71) Applicants: BEIJING LENOVO SOFTWARE LTD., Beijing (CN); LENOVO (BEIJING) LIMITED, Beijing (CN)

(72) Inventors: Shurong He, Beijing (CN); Xiaoli Fan, Beijing (CN); Yue Qin, Beijing (CN); Yuming Xie, Beijing (CN); Yingjia Yao, Beijing (CN); Lei Ma, Beijing (CN); Xiaoqin Han, Beijing (CN)

(73) Assignees: BEIJING LENOVO SOFTWARE LTD., Beijing (CN); LENOVO (BEIJING) LIMITED, Beijing (CN)

( * ) Notice: Subject to any disclaimer, the term of this patent is extended or adjusted under 35 U.S.C. 154(b) by 14 days.

(21) Appl. No.: 14/636,458

(22) Filed: Mar. 3, 2015

(65) Prior Publication Data

US 2016/0048172 A1 Feb. 18, 2016

(30) Foreign Application Priority Data

Aug. 18, 2014 (CN) .......................... 2014 1 0405859
Aug. 18, 2014 (CN) ..................... 2014 2 0464396 U

(51) Int. Cl.

| | |
|---|---|
| ***G06F 1/16*** | (2006.01) |
| ***H04M 1/02*** | (2006.01) |
| *B29L 31/34* | (2006.01) |
| *B29C 45/16* | (2006.01) |

(52) U.S. Cl.

CPC .......... *G06F 1/1656* (2013.01); *G06F 1/1626* (2013.01); *H04M 1/0202* (2013.01); *B29C 45/1615* (2013.01); *B29K 2995/002* (2013.01); *B29L 2031/3481* (2013.01); *H04M 1/0249* (2013.01); *H04M 1/0283* (2013.01)

(58) Field of Classification Search

CPC ............. H04M 1/0202; H04M 1/0283; H04M 1/0249; G06F 1/1626; G06F 1/1656; B29C 45/1615; B29L 2031/3481; B29K 2995/002

See application file for complete search history.

(56) References Cited

U.S. PATENT DOCUMENTS

| | | | | |
|---|---|---|---|---|
| 2009/0194308 A1* | 8/2009 | Cheng | B32B 15/01 | 174/50 |
| 2009/0301748 A1* | 12/2009 | Hsu | B29C 45/14811 | 174/50 |
| 2010/0061040 A1* | 3/2010 | Dabov | G06F 1/1626 | 361/679.01 |
| 2010/0326720 A1* | 12/2010 | Tsao | G02F 1/167 | 174/546 |

(Continued)

*Primary Examiner* — Adrian S Wilson
*Assistant Examiner* — Abhishek Rathod
(74) *Attorney, Agent, or Firm* — Scully Scott Murphy & Presser

(57) ABSTRACT

The present disclosure provides an electronic apparatus and a method for producing a housing, which relate to a technical field of electronics. The electronic apparatus comprises: a housing comprising a side wall forming an accommodating space and having an outer surface which is divided into K appearance layers, where K is a positive integer greater than or equal to 3, and wherein borderlines between adjacent layers in the K appearance layers are parallel to each other.

9 Claims, 18 Drawing Sheets

23
24
22
25
1
2
21

(56) References Cited

U.S. PATENT DOCUMENTS

2011/0005796 A1* 1/2011 Wu ........................ B44C 1/1725
174/50
2011/0048754 A1* 3/2011 Xiong ..................... C23C 26/00
174/50
2012/0003489 A1* 1/2012 Ying ........................ B44C 1/105
428/469
2012/0097412 A1* 4/2012 Wennemer .............. B29C 43/02
174/50
2012/0241185 A1* 9/2012 Hsu ........................ G06F 1/1656
174/50
2014/0125551 A1* 5/2014 Chen ...................... H01Q 1/243
343/878

* cited by examiner

ELECTRONIC APPARATUS AND METHOD FOR PRODUCING HOUSING THEREOF

CROSS-REFERENCE TO RELATED APPLICATION

This application claims the benefit of Chinese Patent Applications No. 201420464396.0 filed on Aug. 18, 2014 and No. 201410405859.0 filed on Aug. 18, 2014 in the State Intellectual Property Office of China, the disclosures of which are incorporated herein by reference.

BACKGROUND

Technical Field

The present disclosure generally relates to a technical field of electronics, in particular to an electronic apparatus and a method for producing a housing.

Related Art

A housing of an electronic apparatus is a protective layer of the electronic apparatus and a coat of the electronic apparatus. Thus, it is desired that the housing not only has a good shatter and compression resistance, but also has an elegant appearance and a good hand feeling.

For appearance, implementation of multilayer colors in the housing is a main scheme.

An intermediate frame, a front panel arranged in front of it and a rear panel (i.e., back casing) mounted behind the intermediate frame are provided to form the housing of the electronic apparatus such as a cell phone, a tablet computer.

However, it causes a complex producing process and degrades the hand feeling and appearance of the housing due to the difficulty of assembling such electronic apparatus caused by three components (the front panel, the rear panel and the intermediate frame).

SUMMARY

It provides an electronic apparatus comprising M electronic elements; a housing having an accommodating space in which the M electronic elements are fixed and arranged, the housing provided with N through-holes from which N electronic elements of the M electronic elements are exposed, M>N≥1 and M and N are both positive integers, wherein the housing comprises: a side wall forming the accommodating space and having an outer surface which is divided into K appearance layers, where K is a positive integer greater than or equal to 3, and wherein borderlines between adjacent layers in the K appearance layers are parallel to each other. The outer surface has an attractive visual effect because of its divided K appearance layers.

In another aspect, an embodiment of the present application also provides a method for producing a housing of an electronic apparatus, the method comprises: forming a first frame body by injection moulding in a first mold, the first frame body forming a first portion of the side wall of the housing; moulding inserts by K−1 times: in the moulding inserts at first time, putting the first frame body as a first insert into a second mold and forming a second frame body by injection moulding, the second frame body constituting a second portion of the side wall of the housing, the second portion including the first portion and forming two appearance layers, wherein the first portion forms one appearance and the part of the second portion other than the first portion forms the other appearance; and do so, in the moulding inserts at the (K−1)th time, putting the (K−1)th frame body as a (K−1)th insert into a Kth mold and forming a Kth frame body by injection moulding, the Kth frame body constituting the side wall of the housing, the side wall forming K appearance layers, wherein K is a positive integer greater than or equal to 3.

BRIEF DESCRIPTION OF THE DRAWINGS

In order to explain the embodiments of the present application, the drawings that are needed to be used in the description of the embodiments are explained simply below. Apparently, the following drawings only illustrate some embodiments of the present application by way of examples. The skilled person in the art can envisage other drawings from the following ones without inventive concepts.

DETAILED DESCRIPTION OF THE EMBODIMENTS

Embodiments of the present application will be described hereinafter in more detail with reference to figures of the attached drawings, so that the objects, technical solutions and advantages of the present application will be more apparent.

First Embodiment

Figure 1:
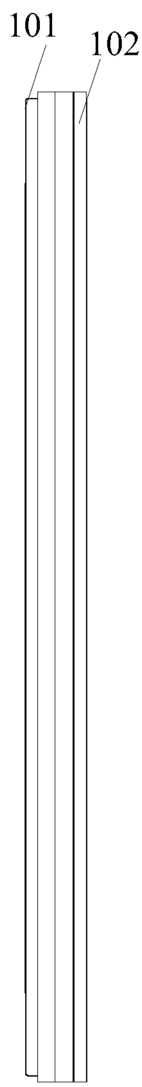
FIG. 1 is a schematic view showing a structure of an electronic apparatus according to a first embodiment of the present application.

An embodiment of the present application provides an electronic apparatus. As illustrated in FIG. 1, the electronic apparatus 10 comprises: M electronic elements 101; and a housing 102 having an accommodating space 103 in which the M electronic elements 101 are fixed and arranged, the housing 102 provided with N through-holes from which N electronic elements 101 of the M electronic elements 101 are exposed, M>N≥1 and M and N are both positive integers.

Figure 2:
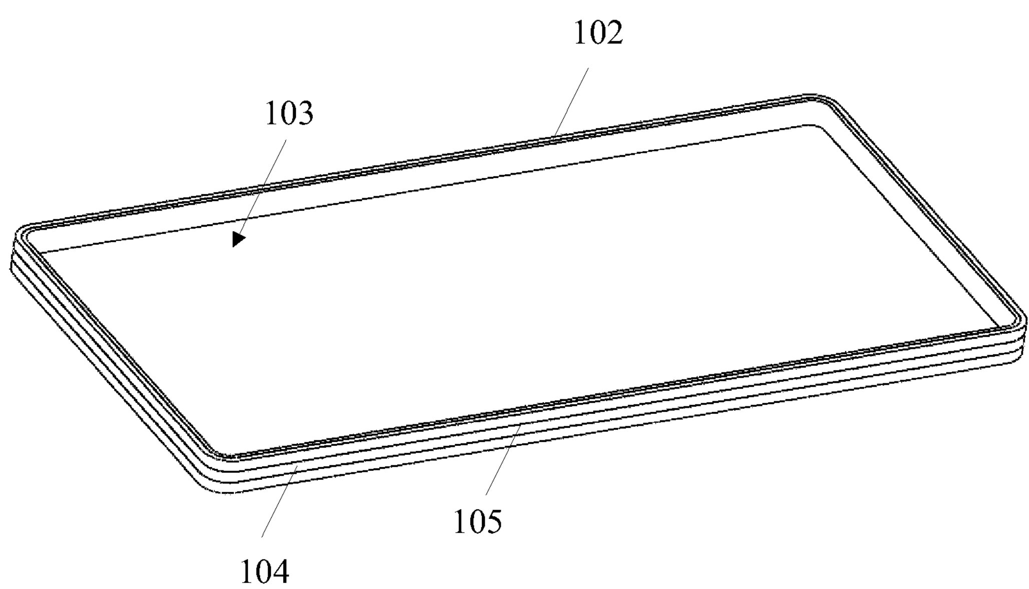
FIG. 2 is a schematic view showing a structure of a housing according to the first embodiment of the present application.

As shown in FIG. 2, the housing 102 comprises: a side wall 104 forming the accommodating space 103 and having an outer surface which is divided into K appearance layers, where K is a positive integer greater than or equal to 3, and borderlines 105 between adjacent layers in the K appearance layers are parallel to each other.

The electronic elements 101 shown in FIG. 1 may be screens of the electronic apparatus.

In the embodiment of the present application, the housing is designed to have an accommodating space in which the M electronic elements are fixed and arranged, the housing provided with N through-holes from which N electronic elements of the M electronic elements are exposed, M>N≥1 and M and N are both positive integers, wherein the housing comprises: a side wall forming the accommodating space and having an outer surface which is divided into K appearance layers, where K is a positive integer greater than or equal to 3, and wherein borderlines between adjacent layers in the K appearance layers are parallel to each other. As the housing includes the side wall forming the accommodating space, it may avoid assembling the intermediate frame and the back casing in the prior art and thus may reduce the complexity of producing process and facilitate assembling. Division of the outer surface of the side wall into the K appearance layers enhances the appearance of the housing. Parallel borderlines between adjacent layers in the K appearance layers are may improve the hand feeling of the housing.

Second Embodiment

Figure 3:
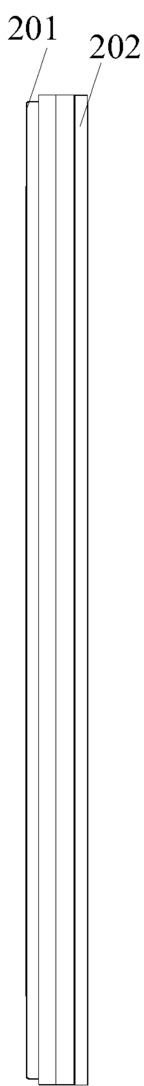
FIG. 3 is a schematic view showing a structure of an electronic apparatus according to a second embodiment of the present application.

An embodiment of the present application provides an electronic apparatus. As illustrated in FIG. 3, the electronic apparatus comprises:

M electronic elements 201; and a housing 202 having an accommodating space 203 in which the M electronic elements 201 are fixed and arranged, the housing 202 provided with N through-holes from which N electronic elements 201 of the M electronic elements 201 are exposed, M>N≥1 and M and N are both positive integers.

Figure 4:
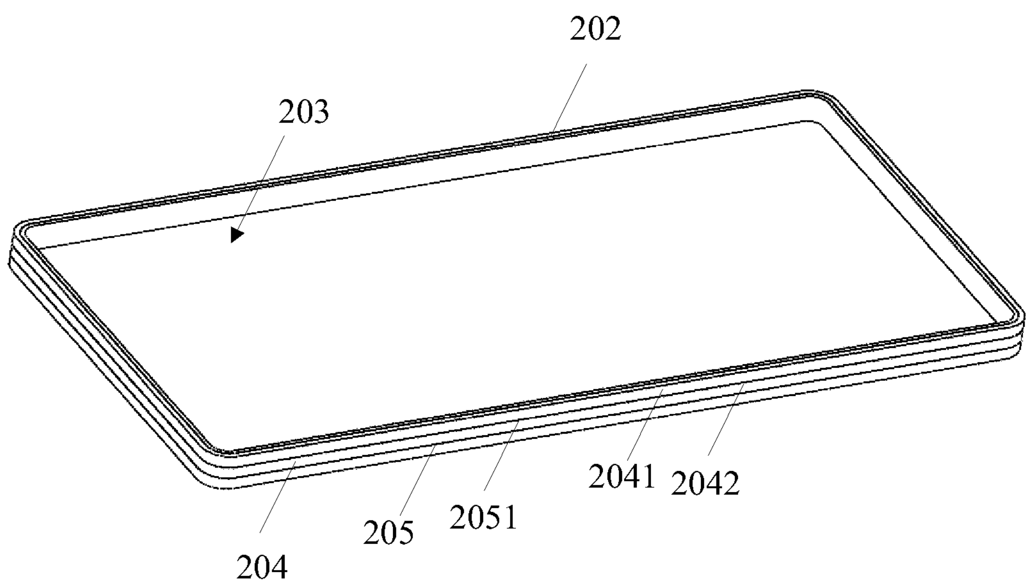
FIG. 4 is a schematic view showing a structure of a housing according to the second embodiment of the present application.

As shown in FIG. 4, the housing 202 comprises: a side wall 204 forming the accommodating space 203 and having an outer surface which is divided into K appearance layers, where K is a positive integer greater than or equal to 3, and borderlines 205 between adjacent layers in the K appearance layers are parallel to each other.

In the embodiment, all of points on a first borderline 2051 between a first layer 2041 in the K appearance layers located on the top of the outer surface of the side wall 204 and a second layer 2042 adjacent to the first layer 2041 have the same vertical distance from a top side of the outer surface of the side wall.

Further, all of vertical distances between any two adjacent borderlines are equal.

In the embodiment, each of the K appearance layers has a different appearance from those of others of the K appearance layers.

In particular, the different appearance may be achieved by the following means:

all of the K appearance layers have the same material, but have different colors from each other. In producing process, it may be moulded by a single color injection machine and then by sprayed with multiple colors to achieve the multi-layer colored housing. The details of the producing process will be explained in the Fifth Embodiment.

In the embodiment of the present application, the housing is designed to have an accommodating space in which the M electronic elements are fixed and arranged, the housing provided with N through-holes from which N electronic elements of the M electronic elements are exposed, M>N≥1 and M and N are both positive integers, wherein the housing comprises: a side wall forming the accommodating space and having an outer surface which is divided into K appearance layers, where K is a positive integer greater than or equal to 3, and wherein borderlines between adjacent layers in the K appearance layers are parallel to each other. As the housing includes the side wall forming the accommodating space, it may avoid assembling the intermediate frame and the back casing in the prior art and thus may reduce the complexity of producing process and facilitate assembling.

Division of the outer surface of the side wall into the K appearance layers enhances the appearance of the housing. Parallel borderlines between adjacent layers in the K appearance layers are may improve the hand feeling of the housing.

Third Embodiment

Figure 5:
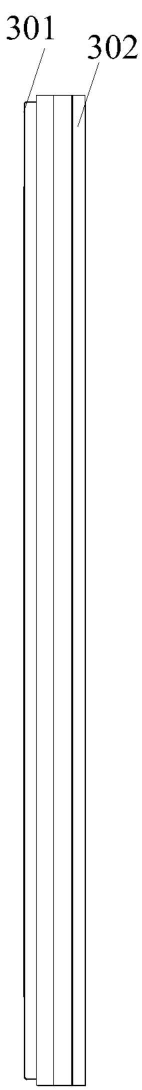
FIG. 5 is a schematic view showing a structure of an electronic apparatus according to a third embodiment of the present application.

An embodiment of the present application provides an electronic apparatus. As illustrated in FIG. 5, the electronic apparatus comprises:

M electronic elements 301; and a housing 302 having an accommodating space 303 in which the M electronic elements 301 are fixed and arranged, the housing 302 provided with N through-holes from which N electronic elements 301 of the M electronic elements 301 are exposed, M>N≥1 and M and N are both positive integers.

Figure 6:
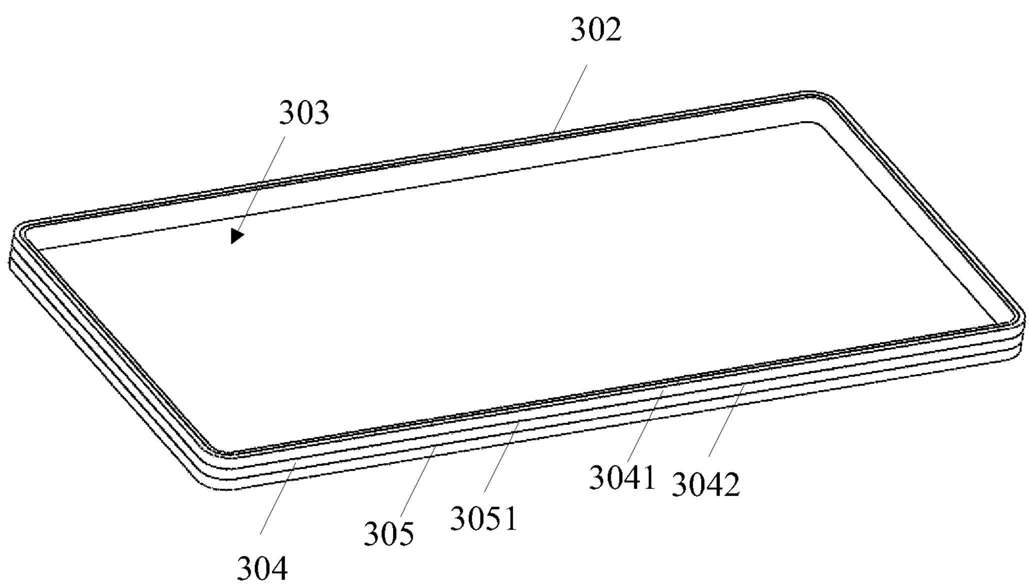
FIG. 6 is a schematic view showing a structure of a housing according to the third embodiment of the present application.

As shown in FIG. 6, the housing 302 comprises: a side wall 304 forming the accommodating space 303 and having an outer surface which is divided into K appearance layers, where K is a positive integer greater than or equal to 3, and borderlines 305 between adjacent layers in the K appearance layers are parallel to each other.

In the embodiment, all of points on a first borderline 3051 between a first layer 3041 in the K appearance layers located on the top of the outer surface of the side wall 304 and a second layer 3042 adjacent to the first layer 3041 have the same vertical distance from a top side of the outer surface of the side wall.

Further, all of vertical distances between any two adjacent borderlines are equal.

In the embodiment, each of the K appearance layers has a different appearance from those of others of the K appearance layers.

In particular, the different appearance may be achieved by the following means:

each of the K appearance layers has a different material from those of the others of the K appearance layers.

Or, two of the K appearance layers have the same material, but have different colors from each other, and a layer between the two layers has different material from the two layers. In producing process, a product having two color effects may be moulded at one time by a double colors injection machine and then "a waistband" is assembled between the two colors to form a three-colors housing. The details of the producing process will be explained in the Sixth Embodiment.

In the embodiment of the present application, the housing is designed to have an accommodating space in which the M electronic elements are fixed and arranged, the housing provided with N through-holes from which N electronic elements of the M electronic elements are exposed, M>N≥1 and M and N are both positive integers, wherein the housing comprises: a side wall forming the accommodating space and having an outer surface which is divided into K appearance layers, where K is a positive integer greater than or equal to 3, and wherein borderlines between adjacent layers in the K appearance layers are parallel to each other. As the housing includes the side wall forming the accommodating space, it may avoid assembling the intermediate frame and the back casing in the prior art and thus may reduce the complexity of producing process and facilitate assembling. Division of the outer surface of the side wall into the K appearance layers enhances the appearance of the housing.

Parallel borderlines between adjacent layers in the K appearance layers are may improve the hand feeling of the housing.

Fourth Embodiment

Figure 7:
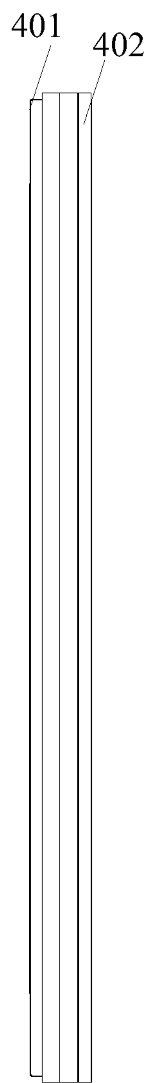
FIG. 7 is a schematic view showing a structure of an electronic apparatus according to a fourth embodiment of the present application.

An embodiment of the present application provides an electronic apparatus. As illustrated in FIG. 7, the electronic apparatus comprises:

M electronic elements 401; and a housing 402 having an accommodating space 403 in which the M electronic elements 401 are fixed and arranged, the housing 402 provided with N through-holes from which N electronic elements 401 of the M electronic elements 401 are exposed, M>N≥1 and M and N are both positive integers.

Figure 8:
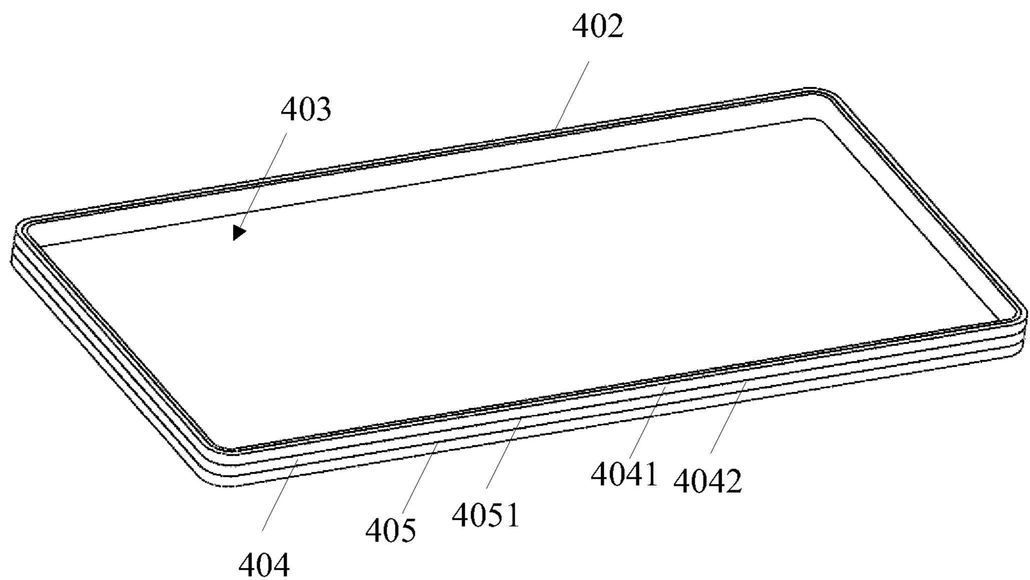
FIG. 8 is a schematic view showing a structure of a housing according to the fourth embodiment of the present application.
Figure 9:
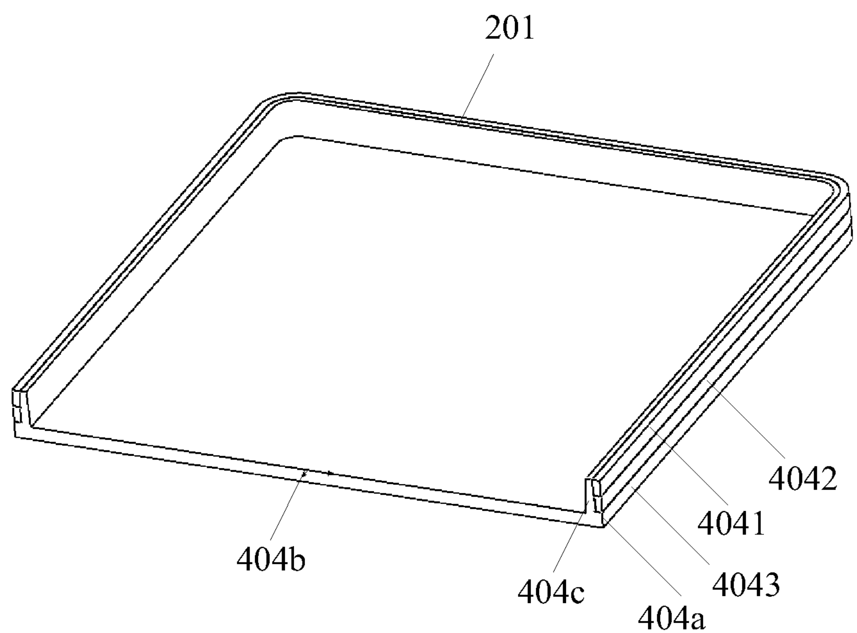
FIG. 9 is a schematic view showing a structure of a housing according to the fourth embodiment of the present application.

As shown in FIGS. 8-9, the housing 402 comprises: a side wall 404 forming the accommodating space 403 and having an outer surface which is divided into K appearance layers, where K is a positive integer greater than or equal to 3, and borderlines 405 between adjacent layers in the K appearance layers are parallel to each other.

In the embodiment, all of points on a first borderline 4051 between a first layer 4041 in the K appearance layers located on the top of the outer surface of the side wall 404 and a second layer 4042 adjacent to the first layer 4041 have the same vertical distance from a top side of the outer surface of the side wall.

Further, all of vertical distances between any two adjacent borderlines are equal.

In the embodiment, each of the K appearance layers has a different appearance from those of others of the K appearance layers.

In particular, the different appearance may be achieved by the following means: each of the K appearance layers has a different material from those of the others of the K appearance layers. The details of the producing process will be explained in the Seventh Embodiment and the Eighth Embodiment.

Further, as shown in FIG. 9, the Kth layer 4043 in the K layers located at the bottom of the outer surface of the side wall 404 includes a bottom frame 404*a*, a bottom surface 404*b* and an inner surface 404*c* formed integrally. The bottom frame 404*a* is connected to an edge of the bottom surface 404*b*. The inner surface 404*c* is provided on the bottom frame 404*a*. The inner surface 404*c* is in contact with the inner profiles of the first layer 4041, the second layer 4042, . . . , the (K−1)th layer. The inner surface 404*c* and the bottom surface 404*b* form the accommodating space for receiving the electronic elements.

By means of the above design of the inner surface, the forces applied to the first to the (K−1)th layers are decreased to avoid the breaking of the side wall of the housing. As in the embodiment, each layer is made from the material different from those of the other layers, there is a certain, but not very strong, interface bonding force between two materials in moulding inserts. Thus, it has a certain risk of breaking. In the embodiment, the Kth layer of the bottom frame, the bottom surface and the inner surface are made from the same material and moulded at one time. Its mechanical properties may meet the normal mechanical requirements (for the same thickness of the side wall, the tensile strength of the side wall of the single injection member is greater than the interface bonding force between two materials of the side wall moulded by inserts), and it may be the primary stressed member. A display screen, an inner main board and other electronic elements are fixed on the member (the bottom frame, the bottom surface and the inner surface). In contrast to it, the interface between the first layer and the second layer, . . . , the interface between the (K−2)th layer and the (K−1)th layer are subject to tiny forces, and thus, a risk of breaking in the side wall of the housing will not occur in use.

In the embodiment of the present application, the housing is designed to have an accommodating space in which the M electronic elements are fixed and arranged, the housing provided with N through-holes from which N electronic elements of the M electronic elements are exposed, M>N≥1 and M and N are both positive integers, wherein the housing comprises: a side wall forming the accommodating space and having an outer surface which is divided into K appearance layers, where K is a positive integer greater than or equal to 3, and wherein borderlines between adjacent layers in the K appearance layers are parallel to each other. As the housing includes the side wall forming the accommodating space, it may avoid assembling the intermediate frame and the back casing in the prior art and thus may reduce the complexity of producing process and facilitate assembling. Division of the outer surface of the side wall into the K appearance layers enhances the appearance of the housing. Parallel borderlines between adjacent layers in the K appearance layers are may improve the hand feeling of the housing.

Figure 28:
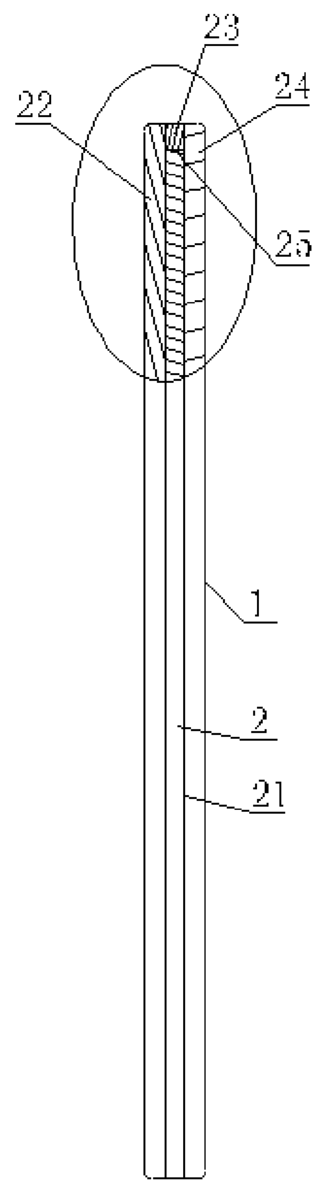
FIG. 28 is a partial sectional view showing another electronic apparatus according to an embodiment of the present application.
Figure 29:
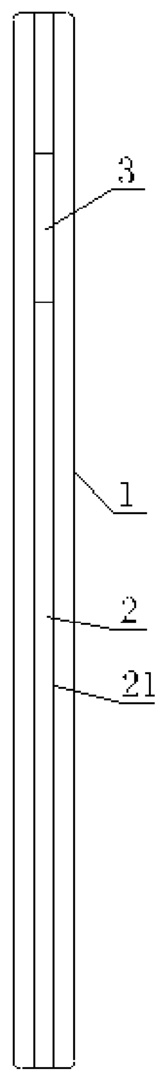
FIG. 29 is a schematic plan view showing a structure of another electronic apparatus according to an embodiment of the present application.

Besides the above embodiments, FIGS. 28 and 29 show additional embodiments of the electronic apparatus of the present application.

Further, as illustrated in FIG. 28, in the above electronic apparatus, K=3, and the housing 1 is moulded integrally. The outer surface of the side wall 2 is formed with a groove 25 in which an intermediate bar 23 is arranged. The intermediate bar has an appearance surface forming an intermediate layer in the K appearance layers. The first layer 22 in the K appearance layers is formed between the intermediate bar 23 and the top side of the outer surface of the side wall 2, and the second layer 24 in the K appearance layers is formed between the intermediate bar 23 and the bottom side of the outer surface of the side wall 2. In particular, in an embodiment, the appearance surface of the side wall 2 is divided into three appearance layers. The outer surface of the first layer 22 may be coated with a first color for a first appearance and the outer surface of the second layer 24 may be coated with a second color for a second appearance. As the groove 25 is provided between the first layer 22 and the second layer 24, it may facilitate coating of the first layer 22 and the second layer 24. In the process of coating, the groove 25 may be coated with the first color and the second color by tiny amount, and the intermediate bar 23 having the third color may be embedded in the groove 25. In this way, an obvious borderline 21 is provided between the intermediate bar 23 and the first layer 22, the second layer 24. By this mean, the processing of the housing 1 becomes easier and the cost becomes lower.

Further, the intermediate bar 23 in transited into the first layer 22 smoothly at the borderline 21 between the intermediate bar 23 and the first layer 22, and the intermediate bar 23 in transited into the second layer 24 smoothly at the borderline 21 between the intermediate bar 23 and the second layer 24. In this way, the appearance surface of the side wall 2 conforms to the customs of the user in visual.

Further, in the electronic apparatus, the housing 1 further includes a bottom surface (not shown). The bottom surface has the same appearance as that of the bottom layer on the appearance surface of the side wall 2. In an embodiment, the bottom surface of the housing 1 and the bottom layer on the appearance surface of the side wall 2 are moulded integrally to form the back casing of the housing. Then, the same appearance may be provided on the back casing. In this way, the processing is easier and the cost may be reduced. In an embodiment, the bottom surface may have the appearance of wood grains or skin grains.

Further, as shown in FIG. 29, the electronic apparatus further comprises a button 3 provided on the intermediate layer in the K appearance layers, where K=3. In particular, the appearance surface of the side wall 2 is divided into three appearance layers. The button 3 provided on the intermediate layer in the K appearance layers may conform to the customs of the user more and may facilitate the operation of the user. Of course, in other embodiments, the button 3 may also be arranged on the top layer or bottom layer in the three appearance layers. It may be provided specifically in accordance with the practical requirements.

Further, in the above electronic apparatus, all of the K appearance layers are made of the same material with different color parameter appearance respectively. In particular, all of the K appearance layers are made of the same material and the outer surfaces of all of the K appearance layers are coated with different colors such that all of appearance layers have different appearance.

Further, in another embodiment, in the above electronic apparatus, all of the K appearance layers are made of different materials respectively and all of different materials have different appearance respectively. In this example, the K appearance layers represent different appearance by different materials.

Further, in another embodiment, as shown in FIG. 28, in the above electronic apparatus, the first layer 22 in the K appearance layers located on the top of the outer surface of the side wall 2 and the second layer 24 in the K appearance layers located on the bottom of the outer surface of the side wall 2 are moulded by double colors injection moulding. Then, the intermediate bar with different colors may be embedded in the groove 25 such that the side wall 2 has three appearance layers. In this way, the first layer 22 and the second layer 24 represent different appearance by double colors injection moulding, which may cause the producing process to become easier and cheaper.

Fifth Embodiment

Figure 10:
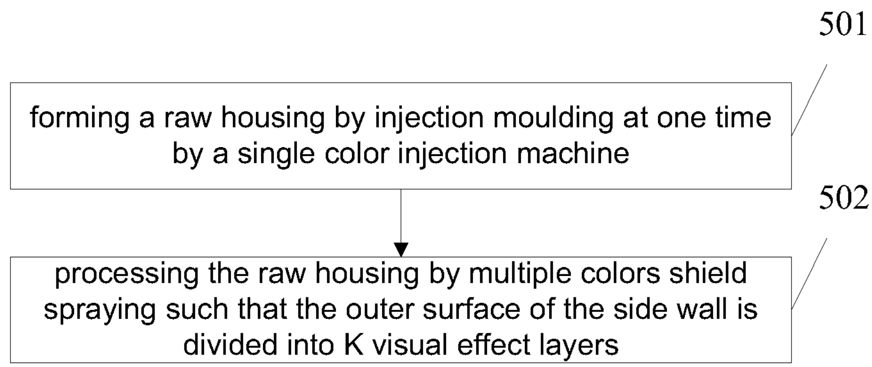
FIG. 10 is a flow chart of a method for producing a housing according to a fifth embodiment of the present application.

An embodiment of the present application provides a method for producing a housing of an electronic apparatus. As shown in FIG. 10, the method comprises:

Step 501: forming a raw housing by injection moulding at one time by a single color injection machine.

Step 502: processing the raw housing by multiple colors shield spraying such that the outer surface of the side wall is divided into K appearance layers, where K is a positive integer greater than or equal to 3 and borderlines between adjacent layers in the K appearance layers are parallel to each other.

In this example, the multiple colors shield spraying is to shield the specific part of the side wall by a specific shielding jig and to spray the unshielded part with colors. The multilayer colors housing may be obtained by the shield spraying by multiple times.

In the embodiment of the present application, the raw housing is processed by the multiple colors shield spraying such that the outer surface of the side wall is divided into K appearance layers, where K is a positive integer greater than or equal to 3 and borderlines between adjacent layers in the K appearance layers are parallel to each other. As the housing includes the side wall forming the accommodating space, it may avoid assembling the intermediate frame and the back casing in the prior art and thus may reduce the complexity of producing process and facilitate assembling.

Division of the outer surface of the side wall into the K appearance layers enhances the appearance of the housing. Parallel borderlines between adjacent layers in the K appearance layers are may improve the hand feeling of the housing.

Sixth Embodiment

Figure 11:
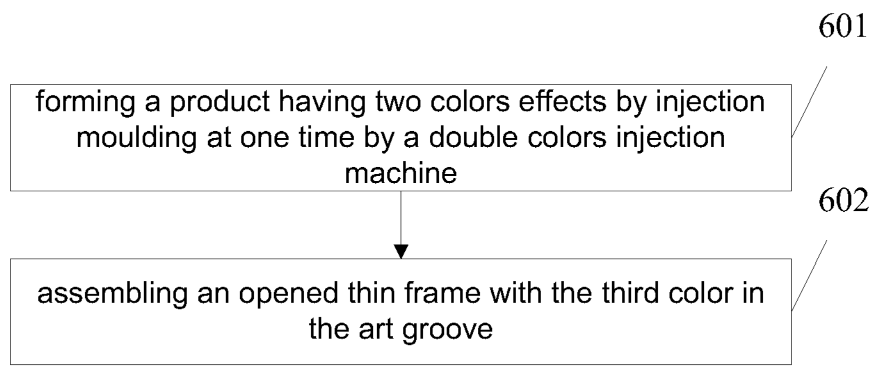
FIG. 11 is a flow chart of a method for producing a housing according to a sixth embodiment of the present application.

An embodiment of the present application provides a method for producing a housing of an electronic apparatus. As shown in FIG. 11, the method comprises:

Step 601: forming a product having two colors effects by injection moulding at one time by a double colors injection machine, the product being provided an art groove at the intermediate position of the side wall thereof.

Step 602: assembling an opened thin frame (waistband) with the third color in the art groove to obtain the three layer colors housing.

In the embodiment of the present application, the raw housing is processed by the multiple colors shield spraying such that the outer surface of the side wall is divided into K appearance layers, where K is a positive integer greater than or equal to 3 and borderlines between adjacent layers in the K appearance layers are parallel to each other. As the housing includes the side wall forming the accommodating space, it may avoid assembling the intermediate frame and the back casing in the prior art and thus may reduce the complexity of producing process and facilitate assembling. Division of the outer surface of the side wall into the K appearance layers enhances the appearance of the housing. Parallel borderlines between adjacent layers in the K appearance layers are may improve the hand feeling of the housing.

Seventh Embodiment

Figure 12:
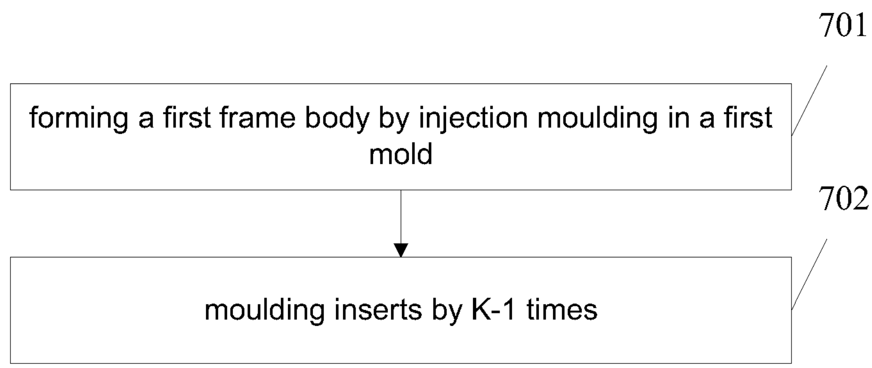
FIG. 12 is a flow chart of a method for producing a housing according to a seventh embodiment of the present application.

An embodiment of the present application provides a method for producing a housing of an electronic apparatus. As shown in FIG. 12, the method comprises:

Step 701: forming a first frame body by injection moulding in a first mold, the first frame body forming a first portion of the side wall of the housing;

Step 702: moulding inserts by K−1 times.

In particular, in the moulding inserts at first time, putting the first frame body as a first insert into a second mold and forming a second frame body by injection moulding, the second frame body constituting a second portion of the side wall of the housing, the second portion including the first portion and forming two appearance layers, wherein the first portion forms one appearance and the part of the second portion other than the first portion forms the other appearance; and do so, in the moulding inserts at the (K−1)th time, putting the (K−1)th frame body as a (K−1)th insert into a Kth mold and forming a Kth frame body by injection moulding, the Kth frame body constituting the side wall of the housing, the side wall having K appearance layers, where K is a positive integer greater than or equal to 3.

The housing produced by the embodiment has a very clear layer to layer border, has no layer to layer gaps and has no breaking beds, in contrast to the housing produced by the Fifth embodiment.

In contrast to the housing produced by the Sixth embodiment, the embodiment uses the single color injection machine to produce the housing such that the cost is significantly reduced in comparison with the double colors injection machine. The housing produced by the embodiment has a very clear layer to layer border, has no layer to layer gaps and has no breaking beds.

In the embodiment of the present application, a first frame body by injection moulding is formed in a first mold and then inserts are moulded by K−1 times. In particular, in the moulding inserts at first time, the first frame body as a first insert is put into a second mold and a second frame body is formed by injection moulding, and do so, in the moulding inserts at the (K−1)th time, the (K−1)th frame body is put as a (K−1)th insert into a Kth mold and a Kth frame body is formed by injection moulding, the Kth frame body constituting the side wall of the housing, the side wall forming K appearance layers, where K is a positive integer greater than or equal to 3. As the housing includes the side wall forming the accommodating space, it may avoid assembling the intermediate frame and the back casing in the prior art and thus may reduce the complexity of producing process and facilitate assembling. Division of the outer surface of the side wall into the K appearance layers enhances the appearance of the housing. Parallel borderlines between adjacent layers in the K appearance layers are may improve the hand feeling of the housing.

Eighth Embodiment

Figure 13:
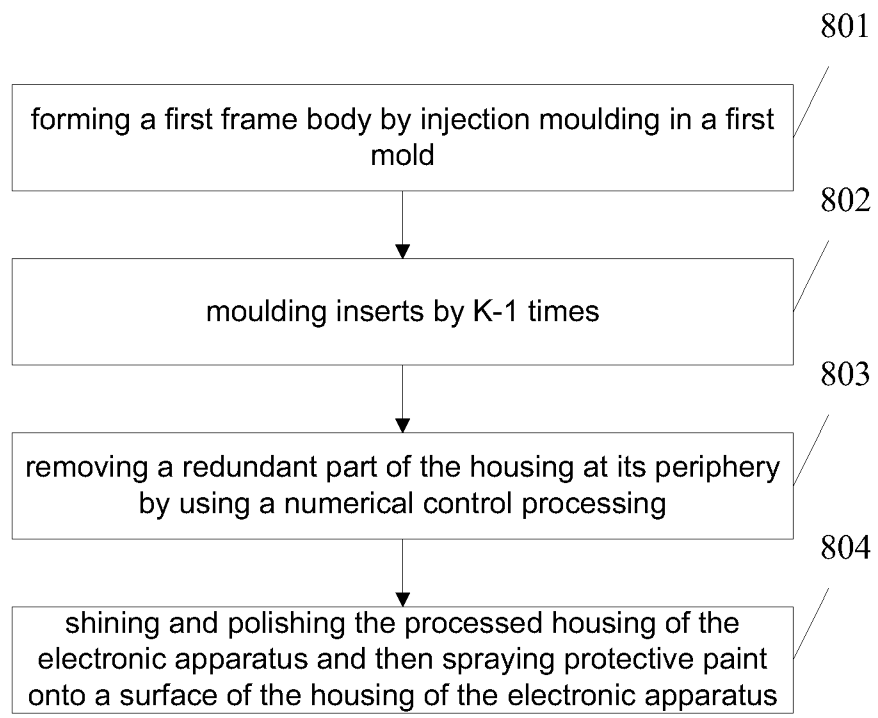
FIG. 13 is a flow chart of a method for producing a housing according to an eighth embodiment of the present application.

An embodiment of the present application provides a method for producing a housing of an electronic apparatus. As shown in FIG. 13, the method comprises:

Step 801: forming a first frame body by injection moulding in a first mold, the first frame body forming a first portion of the side wall of the housing.

Figure 14:
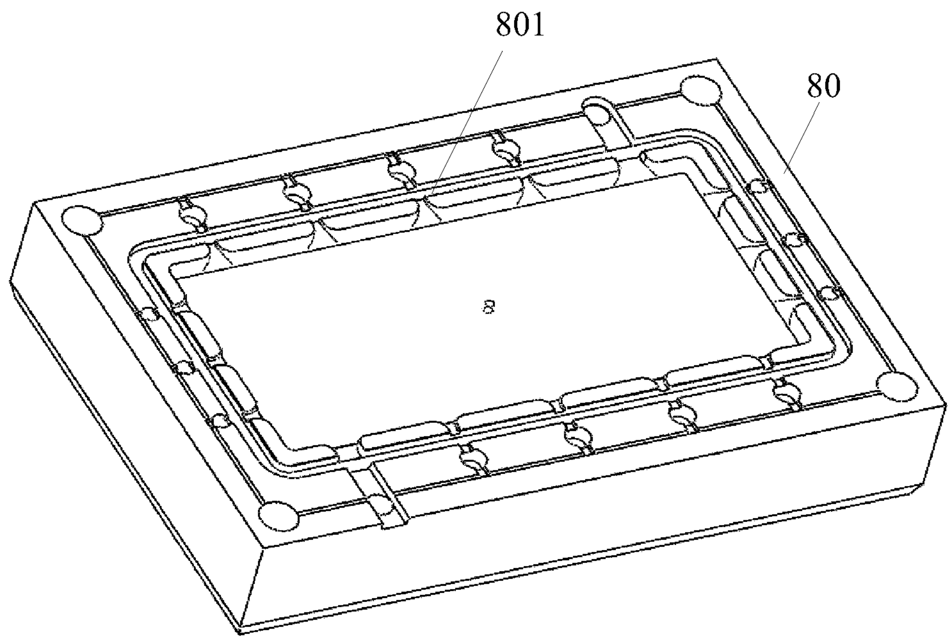
FIG. 14 is a schematic view showing a structure of a first fixed mold according to the eighth embodiment of the present application.

In particular, the first mold includes a first fixed mold 80 (see FIG. 14) and a first cover, the first fixed mold 80 being provided with a first annular groove 81

Figure 15:
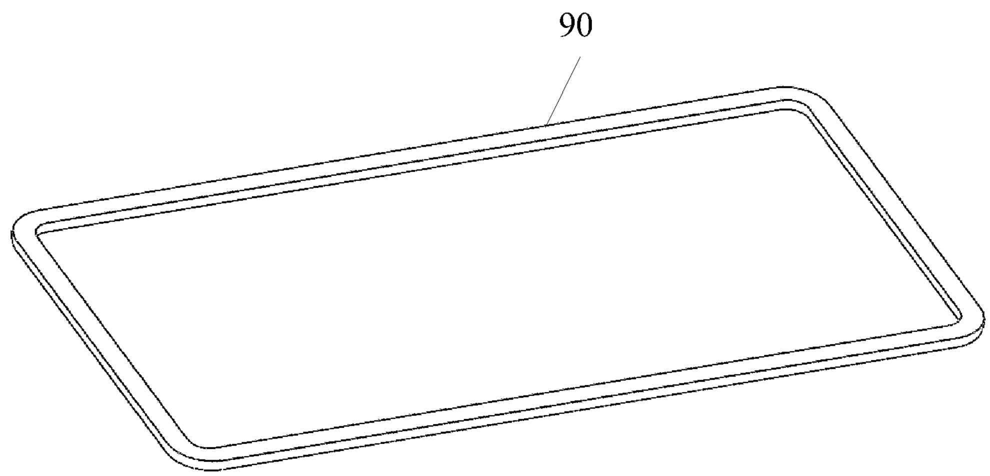
FIG. 15 is a schematic view showing a structure of a first frame according to the eighth embodiment of the present application.

The structure of the first frame body 90 is shown in FIG. 15.

Step 802: moulding inserts by K−1 times.

In particular, in the moulding inserts at first time, putting the first frame body as a first insert into a second mold and forming a second frame body by injection moulding, the second frame body constituting a second portion of the side wall of the housing, the second portion including the first portion and forming two appearance layers, wherein the first portion forms one appearance and the part of the second portion other than the first portion forms the other appearance; and do so, in the moulding inserts at the (K−1)th time, putting the (K−1)th frame body as a (K−1)th insert into a Kth mold and forming a Kth frame body by injection moulding, the Kth frame body constituting the side wall of the housing, the side wall having K appearance layers, where K is a positive integer greater than or equal to 3.

Figure 16:
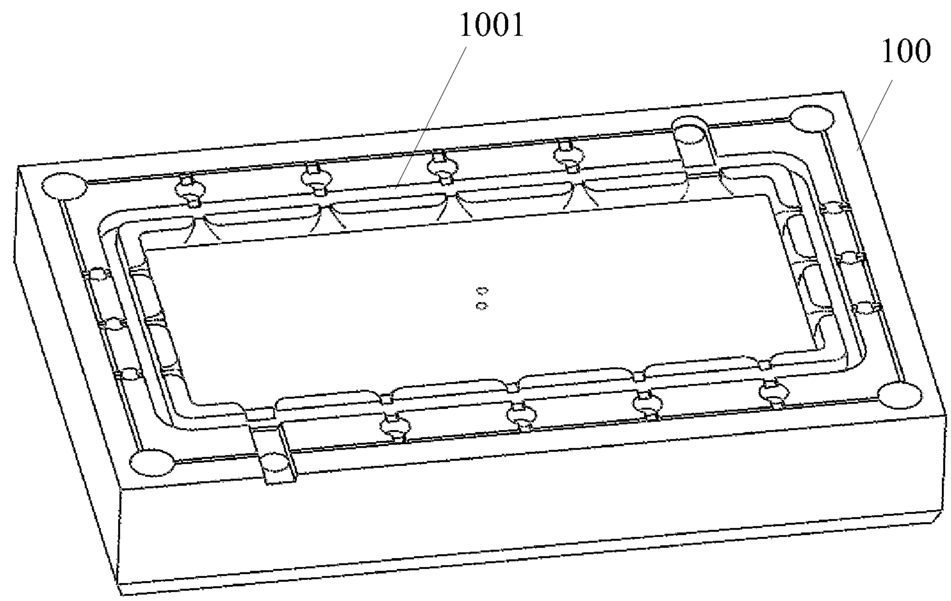
FIG. 16 is a schematic view showing a structure of a second fixed mold according to the eighth embodiment of the present application.

In particular, the second mold includes a second fixed 100 (see FIG. 16) and a second cover, the second fixed mold 100 being provided with a second annular groove 1001. The first annular groove 81 has the same shape as that of the second annular groove 1001. The second annular groove 1001 has a depth greater than that of the first annular groove 81. In mold design, the first fixed mold 80 and the second fixed mold 100 have the same structure except that their depths are different from each other. Certainly, the first fixed mold 80 and the second fixed mold 100 may also be designed to have other different structures.

In addition, the first cover in the first mold and the second cover in the second mold may have the same shape. In order to save the cost, they may be implemented as the same cover.

The cover has the main function of covering the groove in the mold in injection.

Figure 17:
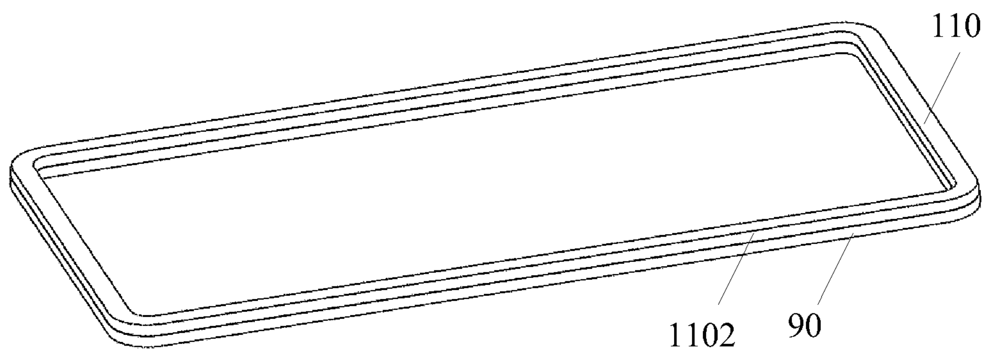
FIG. 17 is a schematic view showing a structure of a second frame according to the eighth embodiment of the present application.

The structure of the second frame body 110 is shown in FIG. 17. The second frame body 110 includes the first portion (i.e., the first frame body 90) and the part 1102 of the second portion other than the first portion.

Figure 18:
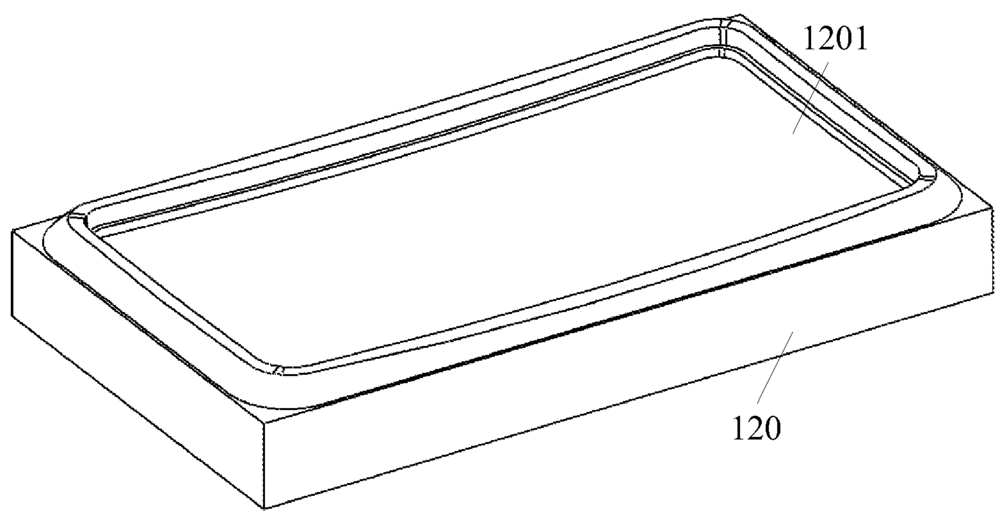
FIG. 18 is a schematic view showing a structure of a Kth fixed mold according to the eighth embodiment of the present application.
Figure 19:
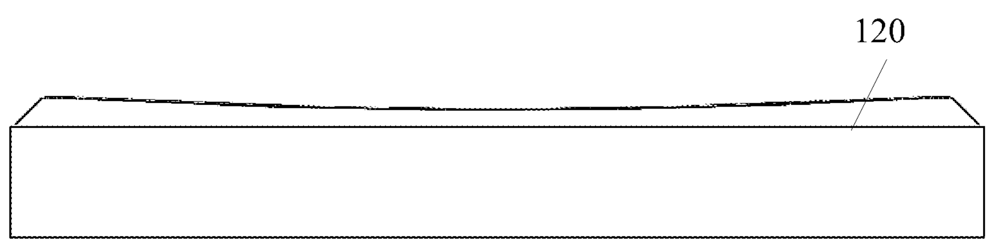
FIG. 19 is a side view showing the Kth fixed mold according to the eighth embodiment of the present application.
Figure 20:
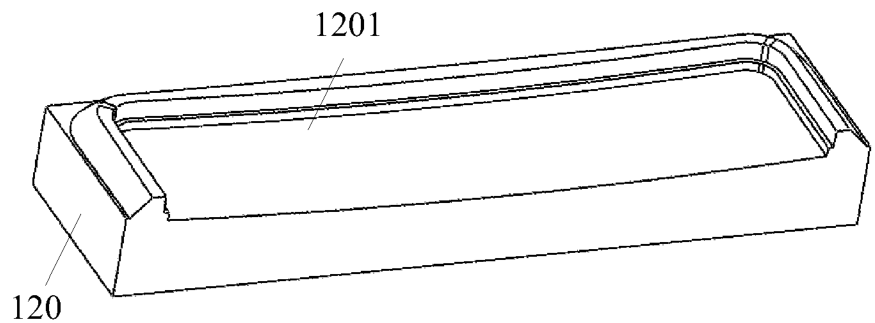
FIG. 20 is a schematic sectional view showing a structure of the Kth fixed mold according to the eighth embodiment of the present application.
Figure 21:
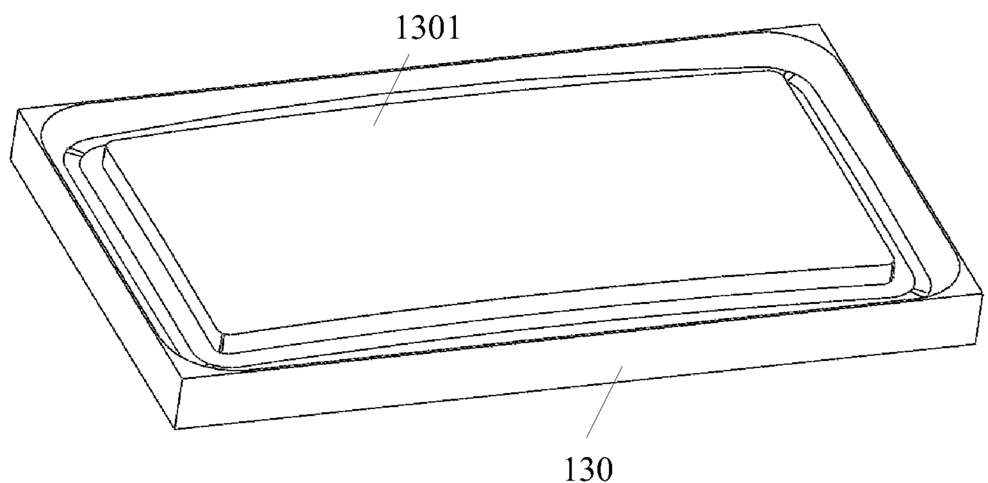
FIG. 21 is a schematic view showing a structure of a movable mold according to the eighth embodiment of the present application.
Figure 22:
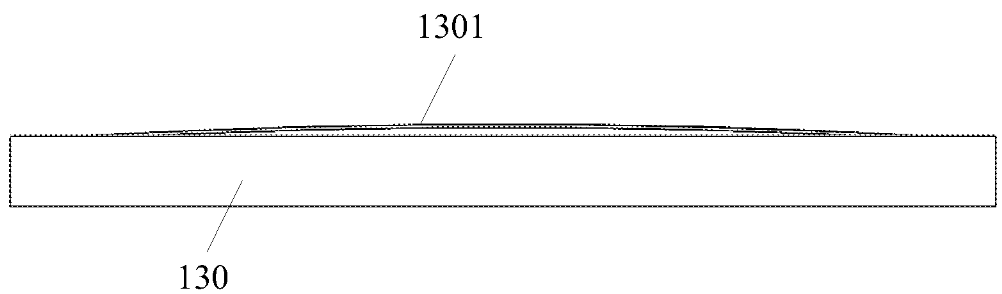
FIG. 22 is a side view showing the movable mold according to the eighth embodiment of the present application.
Figure 23:
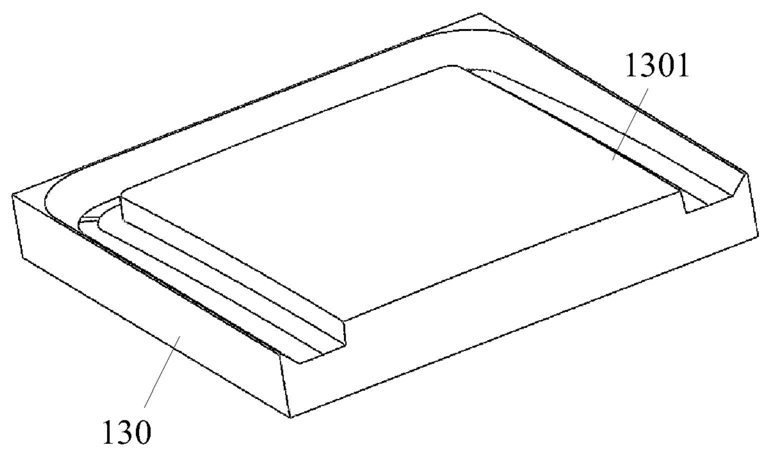
FIG. 23 is a schematic sectional view showing a structure of the movable mold according to the eighth embodiment of the present application.
Figure 24:
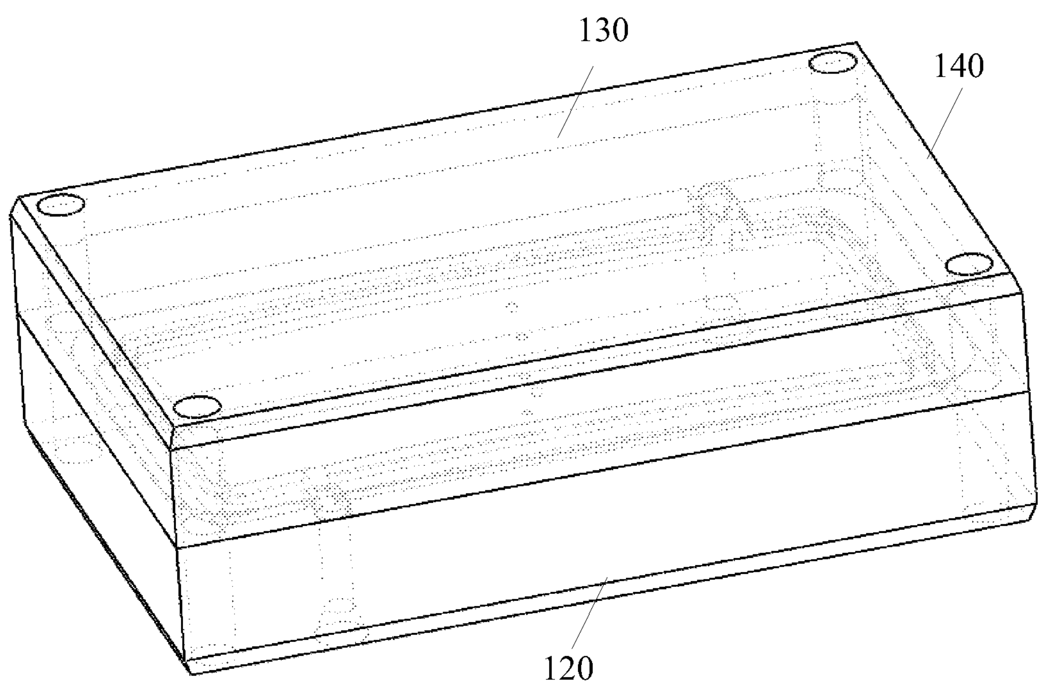
FIG. 24 is a schematic view showing a structure of a Kth mold according to the eighth embodiment of the present application.
Figure 25:
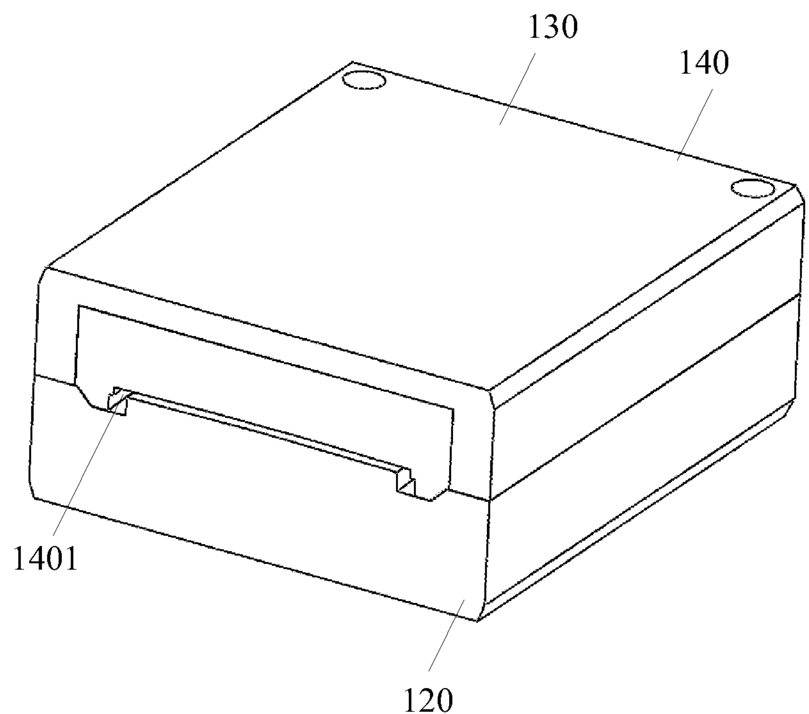
FIG. 25 is a schematic sectional view showing a structure of the Kth mold according to the eighth embodiment of the present application.

In particular, the Kth mold includes the Kth fixed mold 120 (as shown in FIGS. 18-20) and a movable mold 130 (as shown in FIGS. 21-23). The Kth fixed mold 120 is provided with a groove 1201 thereon and the movable mold 130 is provided with a protrusion 1301 thereon. As illustrated in FIGS. 24-25, when the Kth fixed mold 120 and the movable mold 130 are closed, a housing shaped space 1401 between the groove 1201 and the protrusion 1301 on the Kth mold 140 is formed. The outer profile of the space 1401 has the same shape as that of the first annular groove.

Figure 26:
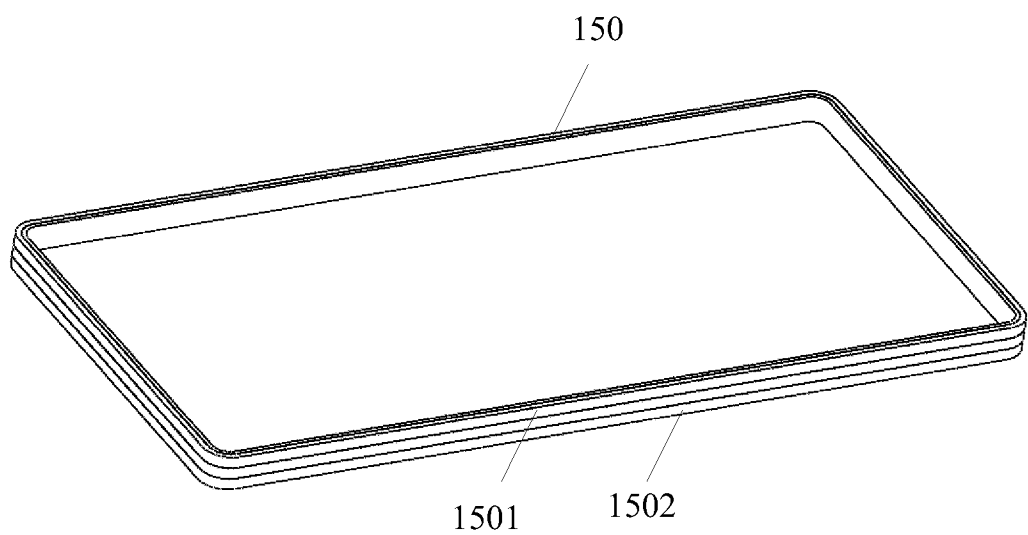
FIG. 26 is a schematic view showing a structure of a housing according to the eighth embodiment of the present application.
Figure 27:
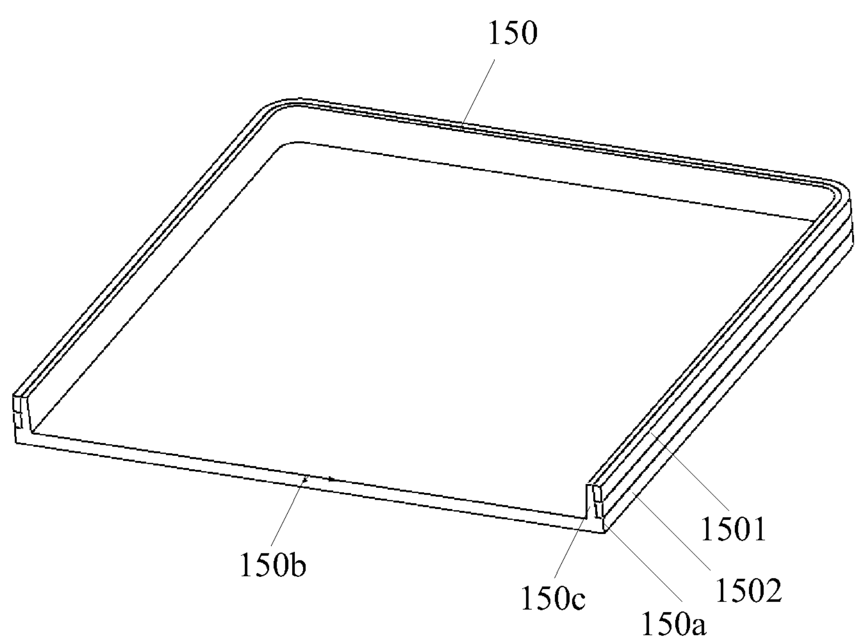
FIG. 27 is a schematic sectional view showing a structure of the housing according to the eighth embodiment of the present application.

In particular, the housing produced by the step 602 (i.e., the Kth frame body) is shown in FIGS. 26-27. The housing 150 includes the (K−1)th frame body 1501 and the layer 1502 formed by moulding inserts at the (K−1)th time.

In the embodiment, the bottom surface 150*b* of the housing 150 is formed by moulding inserts at the (K−1)th time.

The inner surface 150*c* of the housing 150 is formed by moulding inserts at the (K−1)th time and the (K−1)th frame body is arranged around the inner surface 150*c* and the inside of the (K−1)th frame body is combined to the outside of the inner surface 150*c* together. Further, the bottom frame 150*a* is also formed upon moulding inserts at the (K−1)th time. The bottom frame 150*a* is connected to an edge of the bottom surface 150*b* and the inner face 150*c* is provided on the bottom frame 150*a*. The design of the above inner surface may reduce the force to which the first to (K−1)th layers are subject to avoid breaking of the side wall of the housing. As each of the layers is made from the material different from those of the others in the embodiment, there is a certain, but not very strong, interface bonding force between two materials. Thus, it has a certain risk of breaking. In the embodiment, the Kth layer of the bottom frame, the bottom surface and the inner surface are made from the same material and moulded at one time. Its mechanical properties may meet the normal mechanical requirements (for the same thickness of the side wall, the tensile strength of the side wall of the single injection member is greater than the interface bonding force between two materials of the side wall moulded by inserts), and it may be the primary stressed member. A display screen, an inner main board and other electronic elements are fixed on the member (the bottom frame, the bottom surface and the inner surface). In contrast to it, the interface between the first layer and the second layer, . . . , the interface between the (K−2)th layer and the (K−1)th layer are subject to tiny forces, and thus, a risk of breaking on the side wall of the housing will not occur in use.

In the moulding inserts at the (K−1)th time, putting the (K−1)th frame body as the (K−1)th insert into the Kth mold 140 having deformed portion and forming the Kth frame body by injection moulding to form the side wall of the housing, the deformed portion being configured to counteract the deformation of the frame body in the moulding inserts by the K−1 times, during the injection moulding.

In particular, the Kth mold 140 has grooves and protrusions that are formed by arc-shape faces, the arc-shape faces having curvatures designed on the basis of the deformation quantity of the housing obtained by moulding inserts by K−1 times by general molds.

In a general injection moulding, (the average condition of most of manufacturers without limited by resources), the insert moulding products have relatively large deformations. Without predeformation of the mold, the deformation may be corrected in a certain case by adjusting the injection process, however, it cannot be corrected at all in another case, in particular when the insert moulding products are made from the materials having large difference in physical properties (for example, thermal expansion coefficient, thermal conduct coefficient, melt mobility, melt temperature) or from special materials, the insert moulding products will have very serious warpage deformation that cannot be solved only by adjusting the injection process. For example, two materials for injection have very large difference in thermal expansion coefficients, e.g., the material injected later has the thermal expansion coefficient significantly greater than that of the material as the insert, the final product obtained by insert moulding tends to have large deformation, even to break directly. In this circumstance, the warpage deformation cannot be solved only by adjusting the injection process conditions. However, the process of "predeformation" can solve the technical problem.

Thus, the housing produced by the embodiment will not generate the warpage deformation in comparison with those produced by the Fifth Embodiment and the Sixth Embodiment.

In particular, when the predeformation is designed, its parameter (curvature) may be obtained by the following means:

In one method, the insert moulding is carried out in a general process conditions by means of easy dismountable cavity modules (no predeformation, the cavity is an ideal product state). At that time, the insert moulding products will be deformed to some extent. The parameter for deformation of the product is tested and reverse design is carried out on the basis of the parameter in the extent of deformation (for example, if the insert moulding products projects outwards to deform, the normal mold insert cavity will be designed to be recessed to the corresponding extent) in the normal mold insert cavity design, and thus the desired parameter will be obtained. In final moulding, it may be adjusted slightly by the variation of the moulding process parameters. In this way, the housing product with little deformation or without deformation may be obtained. In another method, the warpage deformation data of the insert moulding products may be simulated and calculated by simulation analysis software (such as Moldflow) and the mold is designed reversely on the basis of it.

Further, in the step 802, in the insert moulding, the insert position at which a melt material enters in a high temperature is controlled to correspond to the insert position at which it enters in the moulding inserts at the last previous time.

Generally, in the insert moulding, the moulding runner may cause local melt deformation near the inserts due to fast high pressure impacts on the high temperature melt plastics (in this circumstance, it can be seen from appearance that there is a certain curve deformation of the layer-to-layer border of the two materials and the insert may be concaved slightly in local), but the region that it affects is not large. As long as the region where the melt deformation occurs is designed in the part which will be removed subsequently by CNC, the deformation of the border between two colors may be avoided to be left on the final housing. For example, if the moulding runner is designed outside the side wall and the part outside the side wall will be cut out by CNC, the layer to layer border of the housing will be linear without deformation. Certainly, the moulding runner may also be designed at other position as long as the position corresponds to the position cut out by the CNC. That is, the form, number and position of the moulding runner of the mold may be designed flexibly. In combination the operation of removing redundant part of the moulding member by CNC, the curve deformation of the color border among the multicolors may be avoided completely.

Step 803: removing a redundant part of the housing at its periphery by using a numerical control processing.

In the embodiment, the step of removing a redundant part of the housing at its periphery by using a numerical control processing comprises:

cutting in a longitudinal direction at the position of the redundant part of the housing at its periphery to remove the part in which the borderlines between layers are deformed in the injection moulding, that is, carrying out the cutting process by CNC process.

After the moulding defects (for example, margin/fin at the border of different color materials, blank and breaking bend at the runner) caused by moulding inserts by multiple times are milled by CNC as described in the step 803, the remaining part has a very clear layer to layer border, has no layer to layer gaps and has no breaking beds.

Further, in the steps 801 and 802 of moulding, decoration particles with diameters of tens of micrometers to hundreds of micrometers may be added into the material. After the step 803, some decoration particles may be cut out to represent the special appearance, to have a distinguishing feature.

Step 804: shining and polishing the processed housing of the electronic apparatus and then spraying protective paint onto a surface of the housing of the electronic apparatus.

By means of the above steps 803 and 804, the appearance and hand feeling of the housing may be improved.

In the embodiment of the present application, a first frame body by injection moulding is formed in a first mold and then inserts are moulded by K−1 times. In particular, in the moulding inserts at first time, the first frame body as a first insert is put into a second mold and a second frame body is formed by injection moulding, and do so, in the moulding inserts at the (K−1)th time, the (K−1)th frame body is put as a (K−1)th insert into a Kth mold and a Kth frame body is formed by injection moulding, the Kth frame body constituting the side wall of the housing, the side wall forming K appearance layers, where K is a positive integer greater than or equal to 3. As the housing includes the side wall forming the accommodating space, it may avoid assembling the intermediate frame and the back casing in the prior art and thus may reduce the complexity of producing process and facilitate assembling. Division of the outer surface of the side wall into the K appearance layers enhances the appearance of the housing. Parallel borderlines between adjacent layers in the K appearance layers are may improve the hand feeling of the housing.

The numerals of the embodiments of the present application are provided only by way of examples, instead of representing the quality of the embodiments.

The above embodiments are only those of the present application by way of examples instead of limiting the present application. Any modifications equal replacements, and variations may be envisaged without departing from the principles and spirits of the disclosure should fall within the scope of the present application.

What is claimed is:

1. An electronic apparatus, comprising:

a housing comprising a side wall forming an accommodating space and having an outer surface which is divided into K appearance layers, wherein K is a positive integer greater than or equal to 3, and wherein borderlines between adjacent layers in the K appearance layers are parallel to each other, and wherein all of points on a first borderline between a first layer in the K appearance layers located on the top of the outer surface of the side wall and a second layer adjacent to the first layer have the same vertical distance from a top side of the outer surface of the side wall;

wherein each of the K appearance layers has a different appearance from those of the others of the K appearance layers;

wherein a parameter for appearance of each layer in the K appearance layers in appearance is color;

wherein K=3, the housing is formed integrally, and wherein the outer surface of the side wall is provided with a groove in which an intermediate bar is arranged; and wherein the intermediate bar has an appearance surface forming an intermediate layer in the K appearance layers, the first layer in the K appearance layers being formed between the intermediate bar and the top side of the outer surface of the side wall, and the second layer in the K appearance layers being formed between the intermediate bar and a bottom side of the outer surface of the side wall.

2. The electronic apparatus as claimed in claim 1, wherein all of vertical distances between any two adjacent borderlines are equal.

3. The electronic apparatus as claimed in claim 1, wherein all of the K appearance layers have the same material, but have different colors from each other; or each of the K appearance layers has a different material from those of the others of the K appearance layers; or two of the K appearance layers have the same material, but have different colors from each other, and a layer between the two layers has different material from the two layers.

4. The electronic apparatus as claimed in claim 1, wherein parameters for appearance of layer-to-layer in the K appearance layers in appearance increase progressively.

5. The electronic apparatus as claimed in claim 1, wherein the housing further comprises:

a bottom surface which has the same appearance as that of a bottom layer on the appearance surface of the side wall.

6. The electronic apparatus as claimed in claim 1, further comprising a button provided on an intermediate layer in the K appearance layers, where K=3.

7. The electronic apparatus as claimed in claim 1, wherein all of the K appearance layers are made of the same material with different color parameter appearance respectively.

8. The electronic apparatus as claimed in claim 1, wherein all of the K appearance layers are made of different materials with different appearance respectively.

9. The electronic apparatus as claimed in claim 1, wherein a first layer in the K appearance layers located on the top of the outer surface of the side wall and a second layer in the K appearance layers located on the bottom of the outer surface of the side wall are moulded by double colors injection moulding.

* * * * *

UNITED STATES PATENT AND TRADEMARK OFFICE
CERTIFICATE OF CORRECTION

PATENT NO. : 9,690,331 B2
APPLICATION NO. : 14/636458
DATED : June 27, 2017
INVENTOR(S) : He et al.

It is certified that error appears in the above-identified patent and that said Letters Patent is hereby corrected as shown below:

On the Title Page

(30) Foreign Application Priority Data should read:

Aug. 18, 2014 (CN)......................201410405859.0
Aug. 18, 2014 (CN)......................201420464396.0

Signed and Sealed this
Thirty-first Day of October, 2017

Joseph Matal

Joseph Matal
*Performing the Functions and Duties of the*
*Under Secretary of Commerce for Intellectual Property and*
*Director of the United States Patent and Trademark Office*